US010038805B2

(12) United States Patent
Honda et al.

(10) Patent No.: US 10,038,805 B2
(45) Date of Patent: Jul. 31, 2018

(54) INFORMATION PROCESSING APPARATUS, INFORMATION PROCESSING SYSTEM, AND NON-TRANSITORY COMPUTER-READABLE MEDIUM

(71) Applicant: FUJI XEROX CO., LTD., Tokyo (JP)

(72) Inventors: Seiji Honda, Kanagawa (JP); Yoshiro Konishi, Kanagawa (JP); Takaki Saiki, Kanagawa (JP); Tomokazu Akuta, Kanagawa (JP); Kenichi Ito, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/446,625

(22) Filed: Mar. 1, 2017

(65) Prior Publication Data

US 2018/0084129 A1 Mar. 22, 2018

(30) Foreign Application Priority Data

Sep. 20, 2016 (JP) .................................. 2016-183296

(51) Int. Cl.
  *G06F 15/00* (2006.01)
  *H04N 1/00* (2006.01)
  *H04N 5/63* (2006.01)
  *H04N 17/04* (2006.01)

(52) U.S. Cl.
  CPC ..... *H04N 1/00899* (2013.01); *H04N 1/00283* (2013.01); *H04N 1/00891* (2013.01); *H04N 5/63* (2013.01); *H04N 17/04* (2013.01)

(58) Field of Classification Search
  CPC ....... H04N 1/00283; H04N 5/63; H04N 17/04
  USPC ................................................. 358/1.14–1.13
  See application file for complete search history.

(56) References Cited

U.S. PATENT DOCUMENTS

2014/0098395 A1* 4/2014 Chosokabe ........ H04N 1/00899
  358/1.14

FOREIGN PATENT DOCUMENTS

| JP | 2013-066141 A | 4/2013 |
| JP | 2014-078141 A | 5/2014 |

* cited by examiner

*Primary Examiner* — Saeid Ebrahimi Dehkordy
(74) *Attorney, Agent, or Firm* — Sughrue Mion, PLLC

(57) ABSTRACT

An information processing apparatus includes: a detector that detects a voltage of a power system to which the information processing apparatus itself is connected, from among a plurality of power systems to which are respectively connected a plurality of electrical devices respectively available for communication; a receiver that receives running information expressing running conditions of each of the plurality of electrical devices; and a reporting unit that uses a detection result of the detector and a reception result of the receiver to report whether or not an electrical device corresponding to the running information received by the receiver is connected to the power system to which the information processing apparatus itself is connected.

10 Claims, 10 Drawing Sheets

FIG. 3

| TIME | | | 9:00 | 9:01 | 9:02 | 9:03 | 9:04 | 9:05 | 9:06 | 9:07 | 9:08 | 9:09 | 9:10 | 9:11 |
|---|---|---|---|---|---|---|---|---|---|---|---|---|---|---|
| SMART METER | A | CURRENT | 28 | 34 | 29 | 37 | 32 | 34 | 26 | 29 | 26 | 30 | 37 | 36 |
| IMAGE FORMING APPARATUS A | V | VOLTAGE | 99 | 99 | 99 | 96 | 96 | 99 | 99 | 94 | 94 | 95 | 95 | 97 |
| IMAGE FORMING APPARATUS B | V | VOLTAGE | 93 | 88 | 93 | 95 | 97 | 92 | 92 | 92 | 97 | 95 | 95 | 91 |
| IMAGE FORMING APPARATUS C | V | VOLTAGE | 95 | 94 | 94 | 87 | 90 | 90 | 98 | 100 | 98 | 95 | 88 | 91 |
| DEVICE (1) | PC | | – | – | – | – | – | – | – | – | – | ○ | ○ | – |
| DEVICE (2) | PC | | – | – | – | – | – | – | – | – | – | ○ | ○ | ○ |
| DEVICE (3) | PC | | ○ | ○ | ○ | – | – | – | ○ | ○ | ○ | ○ | ○ | ○ |
| DEVICE (4) | PC | | ○ | ○ | ○ | ○ | – | – | – | – | ○ | ○ | ○ | ○ |
| DEVICE (5) | PC | | ○ | – | – | ○ | ○ | ○ | ○ | – | – | – | ○ | ○ |
| DEVICE (6) | PT | | – | – | – | – | – | – | – | ○ | ○ | – | – | – |
| DEVICE (7) | PC | | – | ○ | ○ | ○ | ○ | ○ | – | – | – | ○ | ○ | ○ |
| DEVICE (8) | PT | | ○ | ○ | – | – | – | ○ | ○ | ○ | – | – | – | ○ |
| DEVICE (9) | PJ | | – | – | – | ○ | ○ | – | – | – | – | – | – | – |
| DEVICE (10) | TV | | ○ | ○ | ○ | ○ | ○ | ○ | ○ | ○ | ○ | ○ | ○ | ○ |
| DEVICE (11) | PT | | – | – | – | ○ | ○ | ○ | – | – | – | – | ○ | ○ |
| DEVICE (12) | PJ | | – | ○ | ○ | ○ | – | – | – | – | – | – | – | – |
| DEVICE (13) | PJ | | – | ○ | ○ | ○ | ○ | ○ | – | – | – | ○ | ○ | – |
| DEVICE (14) | TV | | – | – | – | – | ○ | ○ | ○ | ○ | ○ | ○ | ○ | – |
| DEVICE (15) | TV | | – | – | – | – | – | – | – | – | – | – | – | – |

PC: PERSONAL COMPUTER   PT: PRINTER   PJ: PROJECTOR   TV: TELEVISION

FIG. 5

| MANAGEMENT TABLE | | | SENSED VOLTAGE (○: DEVICE RUNNING, −: DEVICE NOT RUNNING) | | | | | | | | | | | |
|---|---|---|---|---|---|---|---|---|---|---|---|---|---|---|
| TIME | | | 9:00 | 9:01 | 9:02 | 9:03 | 9:04 | 9:05 | 9:06 | 9:07 | 9:08 | 9:09 | 9:10 | 9:11 |
| IMAGE FORMING APPARATUS B | V | VOLTAGE | 93 | 88 | 93 | 95 | 97 | 92 | 92 | 92 | 97 | 95 | 95 | 91 |
| DEVICE (1) | | PC | | | | | | | | | | | ○ | − |
| DEVICE (2) | | PC | | | | | | | | | | | ○ | ○ |
| DEVICE (3) | 2 | PC | ○ | ○ | | | | − | ○ | ○ | ○ | ○ | ○ | ○ |
| DEVICE (4) | | PC | ○ | ○ | ○ | | | | | − | ○ | ○ | ○ | ○ |
| DEVICE (5) | | PC | ○ | − | − | ○ | | ○ | ○ | − | − | − | ○ | ○ |
| DEVICE (6) | | PT | | | | | | | − | ○ | ○ | − | − | − |
| DEVICE (7) | | PC | | ○ | ○ | ○ | ○ | ○ | − | | | ○ | ○ | ○ |
| DEVICE (8) | 5 | PT | ○ | | | − | − | ○ | ○ | ○ | − | − | − | ○ |
| DEVICE (9) | | PJ | | − | ○ | ○ | − | − | − | − | − | − | − | − |
| DEVICE (10) | | TV | ○ | ○ | ○ | ○ | ○ | ○ | ○ | ○ | ○ | ○ | ○ | ○ |
| DEVICE (11) | | PT | | − | ○ | ○ | ○ | − | | | | − | ○ | ○ |
| DEVICE (12) | | PJ | | ○ | ○ | | | | | | | | | |
| DEVICE (13) | | PJ | | ○ | ○ | ○ | ○ | ○ | − | | | ○ | ○ | − |
| DEVICE (14) | | TV | | | | − | ○ | ○ | ○ | ○ | ○ | ○ | ○ | − |
| DEVICE (15) | | TV | | | | | | | | | | | | |
| UNAVAILABLE | | | | | | | | | | | | | | |

5 v = (7) + (12) + (13) − (5)
−2 v = (5) + (9) + (11) − (3)
5 v = (8) − (9)
0 v = (6) − (5)
2 v = (1) + (2) + (7) + (13) − (6)
4 v = (8) − (1) − (13) − (14)

5 v = −(8)
−2 v = (14) − (4) − (12)
0 v = (3) − (7) − (11) − (13)
−5 v = (4) − (8)
0 v = (5) + (11)

5 = (8) EXCLUDE (9)
0 v = (6) − (5) EXCLUDE (5)(6)

−5 = −(8) CONFIRM:(8)

−5 = (4) − (8) (4) EXCLUDED BY IMAGE FORMING APPARATUS C 0 v = (5) + (11) EXCLUDE (11) DUE TO NO VOLTAGE CHANGE BY EXCLUSION OF (5)

INFORMATION PROCESSING APPARATUS, INFORMATION PROCESSING SYSTEM, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2016-183296 filed Sep. 20, 2016.

BACKGROUND

Technical Field

The present invention relates to an information processing apparatus, an information processing system, and a non-transitory computer-readable medium.

SUMMARY

According to an aspect of the invention, there is provided an information processing apparatus including: a detector that detects a voltage of a power system to which the information processing apparatus itself is connected, from among a plurality of power systems to which are respectively connected a plurality of electrical devices respectively available for communication; a receiver that receives running information expressing running conditions of each of the plurality of electrical devices; and a reporting unit that uses a detection result of the detector and a reception result of the receiver to report whether or not an electrical device corresponding to the running information received by the receiver is connected to the power system to which the information processing apparatus itself is connected.

BRIEF DESCRIPTION OF THE DRAWINGS

Exemplary embodiments of the present invention will be described in detail based on the following figures, wherein:

FIG. 3 is a diagram illustrating an example of a management table created by an image forming apparatus according to an exemplary embodiment;

FIG. 5 is a diagram for explaining a process of sorting between devices linked to the behavior of the power source voltage of an image forming apparatus B, and unrelated devices;

FIG. 6 is a diagram for explaining a process of sorting between devices linked to the behavior of the power source voltage of an image forming apparatus C, and unrelated devices;

DETAILED DESCRIPTION

Figure 1:
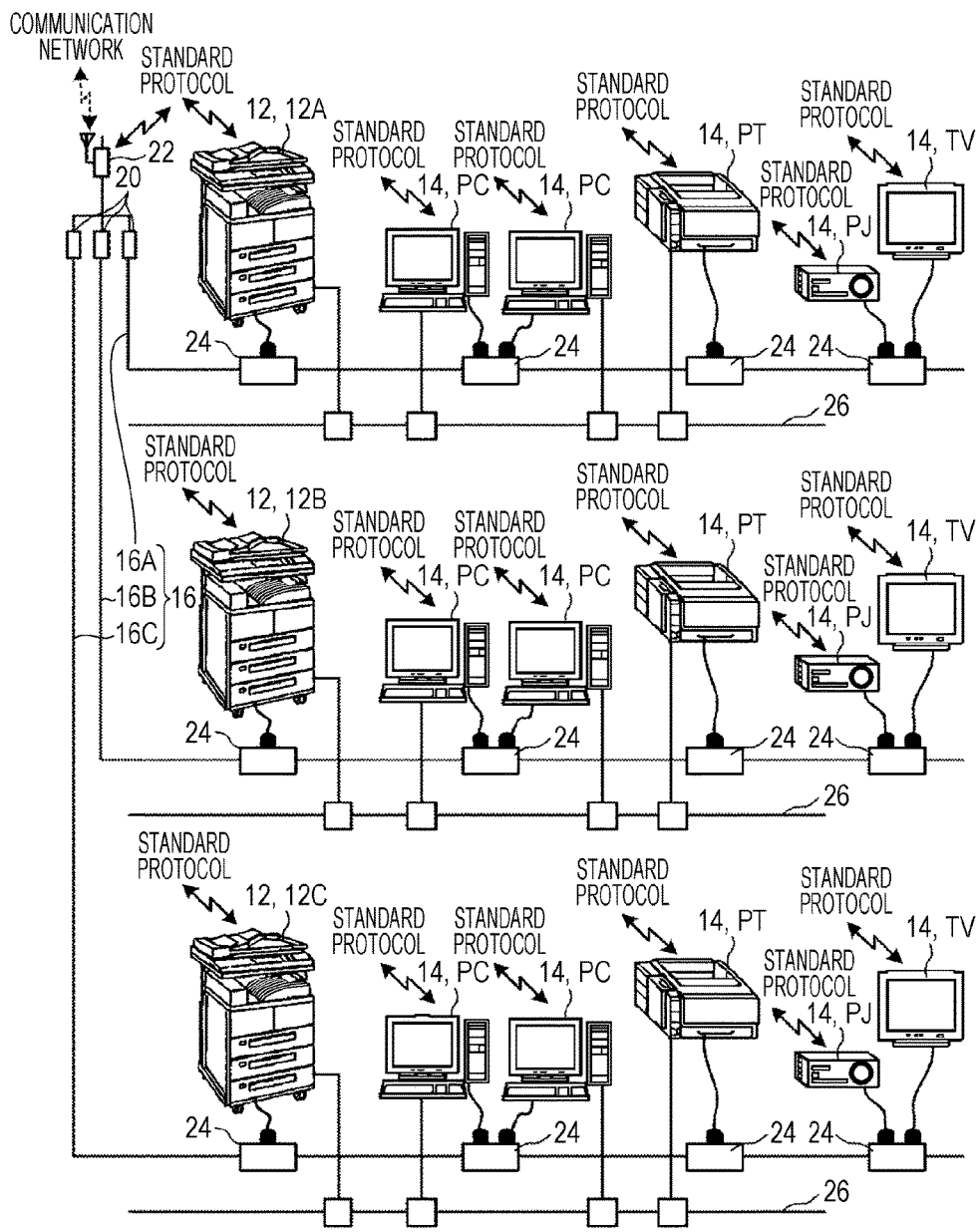
FIG. 1 is a diagram illustrating a configuration of an information processing system according to an exemplary embodiment.

Hereinafter, exemplary embodiments of the invention will be described in detail and with reference to the drawings. FIG. 1 is a diagram illustrating a configuration of an information processing system according to an exemplary embodiment. The information processing system according to the exemplary embodiment includes a building energy management system (BEMS)/home energy management system (HEMS) capable of conducting power management by using a standard protocol to exchange the running states of devices and power information with electrical devices, such as various types of office equipment.

The information processing system 10 according to the exemplary embodiment is provided with multiple image forming apparatuses 12 that act as information processing apparatuses equipped with a BEMS/HEMS controller, and multiple electrical devices 14. Note that for the imaging forming apparatuses 12, a multi-function device provided with at least two or more functions, such as an imaging forming function, an image copying function, an image scanning function, and a facsimile transmitting function, may be applied.

In the exemplary embodiment, an example is described in which three image forming apparatuses 12A to 12C are provided as an example of the multiple image forming apparatuses 12. Also, each image forming apparatus 12 is connected to respectively different power systems 16 via outlets 24. In the example of FIG. 1, the image forming apparatus 12A is connected to a power system 16A, the image forming apparatus 12B is connected to a power system 16B, and the image forming apparatus 12C is connected to a power system 16C.

Each power system 16 is connected to a smart meter 22 via a breaker 20. The smart meter 22 is provided with a communication function for connecting to a communication network such as the Internet, and also includes a communication function for communicating by using a predetermined standard protocol.

Also, on each power system 16, multiple electrical devices 14 are connected respectively via outlets 24. As an example of the electrical devices 14, devices such as a personal computer (PC), a printer (PT), a projector (PJ), and a television (TV) are connected. Also, in the following description, the electrical devices 14 may also be referred to simply as the devices in some cases.

The image forming apparatus 12 and one or some of the multiple electrical devices 14 are connected to a communication link 26 such as a local area network (LAN) to enable bidirectional communication. In FIG. 1, as an example, the image forming apparatus 12, the personal computer PC, and the printer PT are respectively connected to the communication link 26.

In each image forming apparatus 12 and electrical device 14, there is provided a communication unit that uses a standard protocol to transmit and receive the running states of devices and power information. As a result, information related to the running states of devices and power information is exchanged using the standard protocol.

Figure 2:
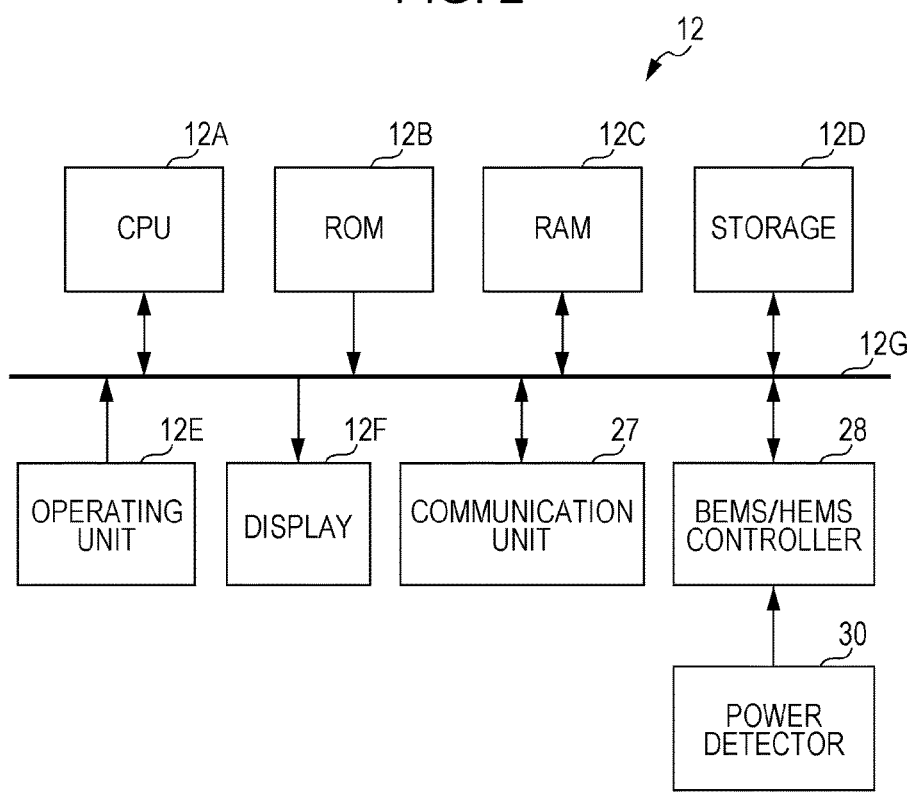
FIG. 2 is a block diagram illustrating part of a configuration of an image forming apparatus according to an exemplary embodiment.

At this point, a schematic configuration of the image forming apparatus 12 will be described briefly. FIG. 2 is a block diagram illustrating part of a configuration of the image forming apparatus 12 according to the exemplary embodiment.

The image forming apparatus 12 is equipped with a central processing unit (CPU) 12A, read-only memory (ROM) 12B, and random access memory (RAM) 12C. The CPU 12A directs the operation of the image forming apparatus 12 overall. The RAM 12C is used as a work area or the like when the CPU 12A executes various programs. The ROM 12B stores information such as various control programs and various parameters in advance. Additionally, each of the CPU 12A, the ROM 12B, and the RAM 12C is connected electrically to a system bus 12G.

The image forming apparatus 12 according to the exemplary embodiment is provided with storage 12D such as a hard disk drive (HDD) that stores information such as various data and application programs, an operating unit 12E for performing various operations, a display 12F for displaying various information, and a communication unit 27. In addition, each of the storage 12D, the operating unit 12E, the display 12F, and the communication unit 27 is connected electrically to the system bus 12G. Note that the communication unit 27 corresponds to an example of a reception unit, and includes interfaces such as an interface for communicating with devices connected to the communication link 26, and an interface for communicating by wireless communication or the like using a standard protocol.

Furthermore, the image forming apparatus 12 according to the exemplary embodiment is provided with a BEMS/HEMS controller 28 for conducting power management, and the BEMS/HEMS controller 28 is connected to the system bus 12G. A power detector 30 is connected to the BEMS/HEMS controller 28 as an example of a detector, and the electric power of the image forming apparatus 12 is detected by the power detector 30. The power detector 30 detects values such as the supplied power supply voltage and current as the electric power of the image forming apparatus 12.

Note that some or all of the electrical devices 14 connected to each power system 16 include a configuration corresponding to the communication unit 27, thereby enabling the exchange of information, such as the running states of devices and power information, using a standard protocol.

Meanwhile, in a case in which multiple power systems 16 are provided, like in the information processing system 10 according to the exemplary embodiment, ascertaining which power system 16 the image forming apparatuses 12 and the electrical devices 14 included in the information processing system 10 are connected to may not be easy.

Accordingly, in the information processing system 10 according to the exemplary embodiment, the image forming apparatus 12 collects running information expressing the running conditions of each device from the electrical devices 14 provided with a communication unit connected to each power system 16 and including the image forming apparatus 12. Subsequently, the image forming apparatus 12 identifies and reports which power system 16 the electrical devices 14 are connected to.

Herein, the identification method of identifying which power system 16 the electrical devices 14 are connected to will be described in detail.

Any one image forming apparatus 12 among the multiple image forming apparatuses 12 is set as a parent apparatus, while the other image forming apparatuses 12 are set in advance as child apparatuses.

Each image forming apparatus 12 acquires the running conditions in real time from electrical devices 14 able to communicate, and manages the voltage values at that time in association with the time and each of the electrical devices 14. Specifically, every time a prescribed amount of time elapses, each image forming apparatus 12 records in a management table a power source voltage detected by the power detector 30 of the image forming apparatus 12, as well as running conditions and voltage levels acquired from the electrical devices 14 able to communicate. For example, as illustrated in FIG. 3, the management table is a table created so that for every predetermined time set as the prescribed amount of elapsed time, the voltage detected by the power detector 30 of each image forming apparatus 12, the current detected by the smart meter 22, the running conditions of respective electrical devices 14, and the like are recorded in a matrix. Note that in FIG. 3, "O" denotes that a device is running, while "–" denotes that a device is not running. Also, the image forming apparatuses A to C in FIG. 3 correspond to the image forming apparatuses 12A to 12C.

Figure 4:
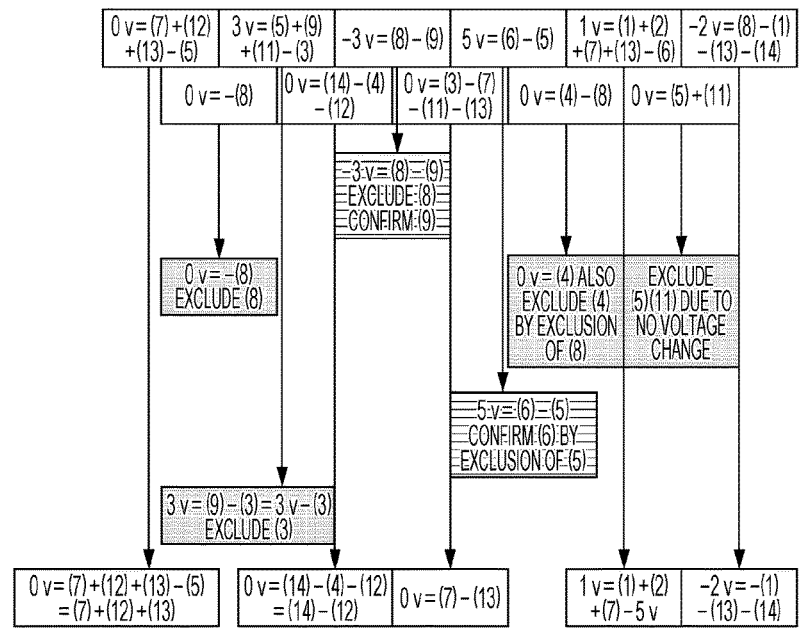
FIG. 4 is a diagram for explaining a process of sorting between devices linked to the behavior of the power source voltage of an image forming apparatus A, and unrelated devices.
Figure 6:
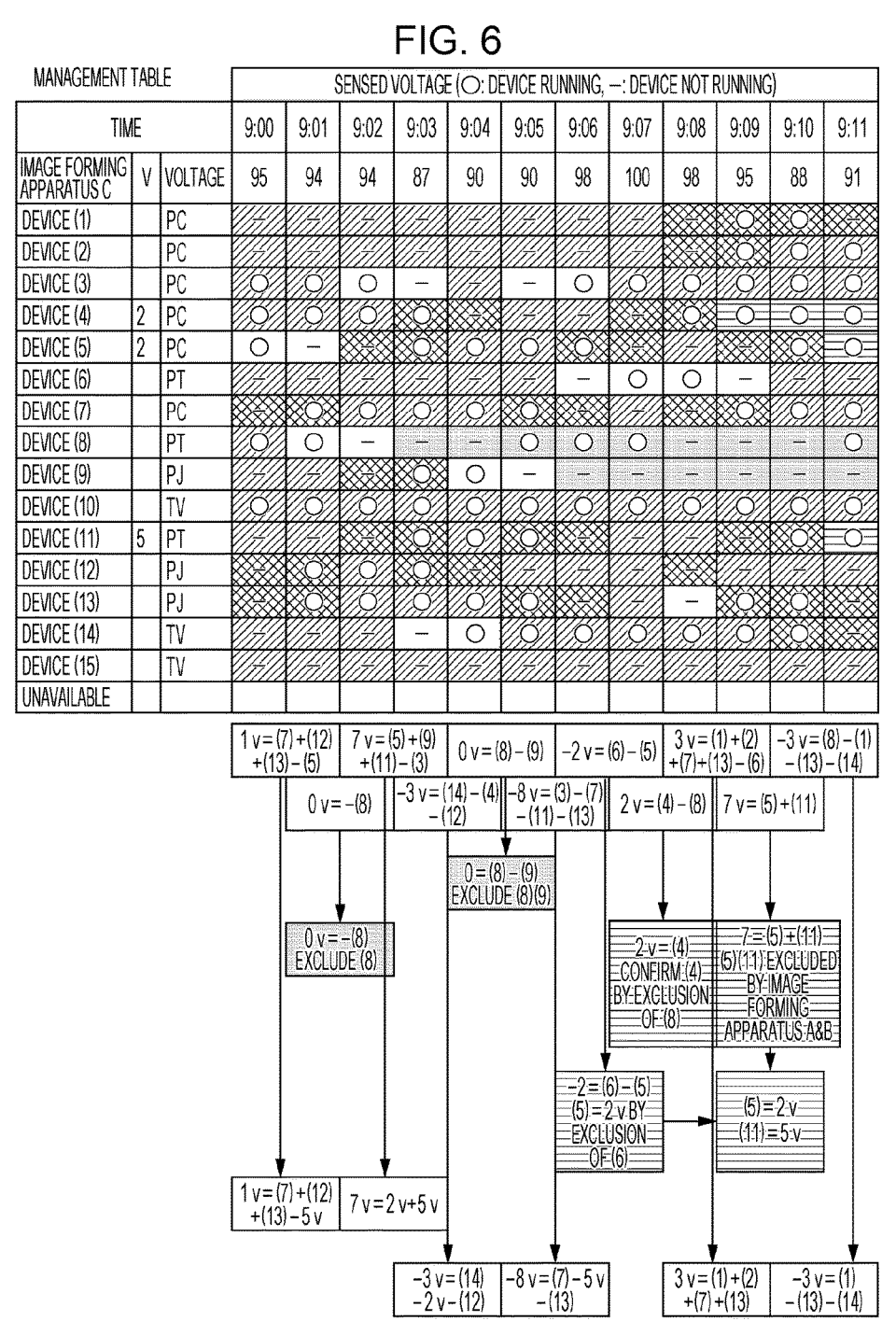

For example, as illustrated in FIGS. 4 to 6 (discussed in detail later), each image forming apparatus 12 sorts between devices linked to changes in the behavior of the power source voltage detected every time the prescribed amount of time elapses, and devices unrelated to changes in the behavior of the power source voltage. FIG. 4 is a diagram for explaining a process of sorting between devices linked to the behavior of the power source voltage of the image forming apparatus 12A according to the exemplary embodiment, and unrelated devices. FIG. 5 is a diagram for explaining a process of sorting between devices linked to the behavior of the power source voltage of the image forming apparatus 12B according to the exemplary embodiment, and unrelated devices. Also, FIG. 6 is a diagram for explaining a process of sorting between devices linked to the behavior of the power source voltage of the image forming apparatus 12C according to the exemplary embodiment, and unrelated devices. Note that the image forming apparatuses A to C in FIGS. 4 to 6 correspond to the image forming apparatuses 12A to 12C, similarly to FIG. 3.

Subsequently, each child image forming apparatus 12 periodically transmits the recorded management table to the parent image forming apparatus 12. Consequently, in the parent image forming apparatus 12, since the devices whose running conditions are synchronized with the voltage level may be removed from the other power systems 16, the parent image forming apparatus 12 notifies each child image forming apparatus 12 that the relevant devices are not devices connected to the power system 16 of each child image forming apparatus 12 itself. In the each child image forming apparatus 12, the notification result from the parent image forming apparatus 12 is applied to the management table. Consequently, in each image forming apparatus 12, as time elapses, which power system 16 each electrical device 14 is connected to becomes identified. In additionally, ultimately, in each image forming apparatus 12, the electrical devices 14 connected to the same power system 16 as the image forming apparatus 12 itself are identified, and thus these electrical devices 14 are reported to the user. As a reporting method, an identification result may be displayed on the display 12F, which acts as an example of a reporting unit, in response to a request due to an operation on the operating unit 12E or the like. Alternatively, the identification result may be transmitted to the requesting computer or the like by a method such as electronic mail. Alternatively, the identification result may be formed as an image and output.

At this point, a process of sorting between devices linked to the behavior of the power source voltage of the image forming apparatus 12A illustrated in FIG. 4 and unrelated devices will be described specifically.

First, consider the time from 9:00 to 9:01. At this time, there is no change in the behavior of the power source voltage, but among the electrical devices 14, the running conditions of Devices (5), (7), (12), and (13) are changing. Provided that "+" indicates when a device changes from not running "−" to running "O", and that "−" indicates when a device changes from running "O" to not running "−", the image forming apparatus 12A records the formula 0v=(7)+(12)+13)−(5) in the management table.

In the next time from 9:01 to 9:02, the behavior of the power source voltage does not change, while among the electrical devices 14, only Device (8) is changing, and thus the image forming apparatus 12A records the formula 0v=−(8) in the management table. At this point, since Device (8) changes from running to not running even though there is no change in the power source voltage, Device (8) is determined not to be connected to the same power system 16A as the image forming apparatus 12A. Consequently, Device (8) is excluded from the group connected to the same power system 16A as the image forming apparatus 12A. In other words, if the formula is a monomial formula, the relevant device is identified as being excluded from or connected to the same power system 16.

In the next time from 9:02 to 9:03, the power source voltage changes by 3v, while among the electrical devices 14, the running conditions of Devices (3), (5), (9), and (11) are changing, and thus the image forming apparatus 12A records the formula 3v=(5)+(9)+(11)−(3) in the management table.

In the next time from 9:03 to 9:04, the behavior of the power source voltage does not change, while among the electrical devices 14, the running conditions of Devices (4), (12), and (14) are changing, and thus the image forming apparatus 12A records the formula 0v=(14)−(4)−(12) in the management table.

In the next time from 9:04 to 9:05, the power source voltage changes by 3v, while among the electrical devices 14, the running conditions of Devices (8) and (9) are changing, and thus the image forming apparatus 12A records the formula −3v=(8)−(9) in the management table. At this point, since (8) is already excluded, the formula becomes −3v=−(9), and since the voltage change matches the change in the running conditions, Device (9) is identified as being connected to the same power system 16A as the image forming apparatus 12A.

In the next time from 9:05 to 9:06, the behavior of the power source voltage does not change, while among the electrical devices 14, the running conditions of Devices (3), (7), (11), and (13) are changing, and thus the image forming apparatus 12A records the formula 0v=(3)−(7)−(11)−(13) in the management table.

In the next time from 9:06 to 9:07, the power source voltage changes by 5v, while among the electrical devices 14, the running conditions of Devices (5) and (6) are changing, and thus the image forming apparatus 12A records the formula 5v=(6)−(5) in the management table.

In the next time from 9:07 to 9:08, there is no change in the behavior of the power source voltage, while among the electrical devices 14, the running conditions of Devices (4) and (8) are changing, and thus the image forming apparatus 12A records the formula 0v=(4)−(8) in the management table. At this point, since Device (8) is already excluded, Device (4) is also excluded from the group connected to the same power system 16A as the image forming apparatus 12A.

In the next time from 9:08 to 9:09, the power source voltage changes by 1v, while among the electrical devices 14, the running conditions of Devices (1), (2), (6), (7), and (13) are changing, and thus the image forming apparatus 12A records the formula 1v=(1)+(2)+(7)+(13)−(6) in the management table.

In the next time from 9:09 to 9:10, there is no change in the behavior of the power source voltage, while among the electrical devices 14, the running conditions of Devices (5) and (11) are changing, and thus the image forming apparatus 12A records the formula 0v=(5)+(11) in the management table. At this point, since there is no change in the behavior of the power source voltage, Devices (5) and (11) are excluded from the group connected to the same power system 16A as the image forming apparatus 12A. Also, since (5) is excluded, (5) is also excluded from the above formula 5v=(6)−(5). Also, since (5) is excluded, from the above formula 5v=(6)−(5), Device (6) is identified to be connected to the same power system 16A as the image forming apparatus 12A. Also, from these results, the above formula 3v=(5)+(9)+(11)−(3) becomes 3v=(9)−(3)=3v−(3), and Device (3) is excluded from the group connected to the same power system 16A as the image forming apparatus 12A.

In the next time from 9:10 to 9:11, the power source voltage changes by 2v, while among the electrical devices 14, the running conditions of Devices (1), (8), (13), and (14) are changing, and thus the image forming apparatus 12A records the formula −2v=(8)−(1)−(13)−(14) in the management table.

If the formulas are updated using the identified and excluded results for the same power system 16A as the image forming apparatus 12A as above, the formulas are updated to the formulas illustrated in the lowermost row of FIG. 4. Namely, the formulas become 0v=(7)+(12)+(13), 0v=(14)−(12), 0v=(7)−(13), 1v=(1)+(2)+(7)−5v, and −2v=(1)−(13)−(14).

Next, a process of sorting between devices linked to the behavior of the power source voltage of the image forming apparatus 12B illustrated in FIG. 5 and unrelated devices will be described specifically.

First, consider the time from 9:00 to 9:01. In this time, the behavior of the power source voltage does not change, while among the electrical devices 14, the running conditions of Devices (5), (7), (12), and (13) are changing, and thus the image forming apparatus 12B records the formula 5v=(7)+(12)+(13)−(5) in the management table.

In the next time from 9:01 to 9:02, the power source voltage changes by 5v, while among the electrical devices 14, only Device (8) is changing, and thus the image forming apparatus 12B records the formula 5v=−(8) in the management table. At this point, since the formula is monomial and the voltage change matches the change in the running conditions, Device (8) is identified as being connected to the same power system 16B as the image forming apparatus 12B.

In the next time from 9:02 to 9:03, the power source voltage changes by 2v, while among the electrical devices 14, the running conditions of Devices (3), (4), (9), and (11) are changing, and thus the image forming apparatus 12B records the formula −2v=(5)+(9)+(11)−(3) in the management table.

In the next time from 9:03 to 9:04, the power source voltage changes by 2v, while among the electrical devices 14, the running conditions of Devices (4), (12), and (14) are changing, and thus the image forming apparatus 12B records the formula −2v=(14)−(4)−(12) in the management table.

In the next time from 9:04 to 9:05, the power source voltage changes by 5v, while among the electrical devices 14, the running conditions of Devices (8) and (9) are changing, and thus the image forming apparatus 12B records the formula 5v=(8)−(9) in the management table. At this point, since Device (8) is already identified, the formula becomes 5v=5 v−(9), and Device (9) is excluded from the group connected to the same power system 16B as the image forming apparatus 12B.

In the next time from 9:05 to 9:06, the behavior of the power source voltage does not change, while among the electrical devices 14, the running conditions of Devices (3), (7), (11), and (13) are changing, and thus the image forming apparatus 12B records the formula 0v=(3)−(7)−(11)−(13) in the management table.

In the next time from 9:06 to 9:07, there is no change in the behavior of the power source voltage, while among the electrical devices 14, the running conditions of Devices (5) and (6) are changing, and thus the image forming apparatus 12B records the formula 0v=(6)−(5) in the management table. At this point, since the running conditions of Devices (5) and (6) are changing even though there is no change in the power source voltage, Devices (5) and (6) are determined not to be connected to the same power system 16B as the image forming apparatus 12B, and Devices (5) and (6) are excluded from the group connected to the same power system 16B as the image forming apparatus 12B.

In the next time from 9:07 to 9:08, the power source voltage changes by 5v, while among the electrical devices 14, the running conditions of Devices (4) and (8) are changing, and thus the image forming apparatus 12B records the formula −5v=(4)−(8) in the management table. At this point, since Device (8) is already excluded, Device (4) is also excluded from the group connected to the same power system 16B as the image forming apparatus 12B. Note that Device (4) later becomes excluded from the group connected to the same power system 16B as the image forming apparatus 12B according to the results of the image forming apparatus 12C discussed later.

In the next time from 9:08 to 9:09, the power source voltage changes by 2v, while among the electrical devices 14, the running conditions of Devices (1), (2), (6), (7), and (13) are changing, and thus the image forming apparatus 12B records the formula 2v=(1)+(2)+(7)+(13)−(6) in the management table.

In the next time from 9:09 to 9:10, there is no change in the behavior of the power source voltage, while among the electrical devices 14, the running conditions of Devices (5) and (11) are changing, and thus the image forming apparatus 12B records the formula 0v=(5)+(11) in the management table. At this point, since Device (5) is already excluded, Device (11) is also excluded from the group connected to the same power system 16B as the image forming apparatus 12B. Also, as a result, the above formula becomes −2v=(5)+(9)+(11)−(3)=−(3), and Device (3) is identified as being connected to the same power system 16B as the image forming apparatus 12B.

In the next time from 9:10 to 9:11, the power source voltage changes by 4v, while among the electrical devices 14, the running conditions of Devices (1), (8), (13), and (14) are changing, and thus the image forming apparatus 12B records the formula 4v=(8)−(1)−(13)−(14) in the management table.

If the formulas are updated using the identified and excluded results for the same power system 16B as the image forming apparatus 12B as above, the formulas are updated to the formulas illustrated at the bottom of FIG. 5. Namely, the formulas become 5v=(7)+(12)+(13), −2v=(14)−(12), 0v=(7)−(13), 2v=(1)+(2)+(7)+(13), and 4v=5v−(1)−(13)−(14).

Next, a process of sorting between devices linked to the behavior of the power source voltage of the image forming apparatus 12C illustrated in FIG. 6 and unrelated devices will be described specifically.

First, consider the time from 9:00 to 9:01. In this time, the power source voltage changes by 1v, while among the electrical devices 14, the running conditions of Devices (5), (7), (12), and (13) are changing, and thus the image forming apparatus 12C records the formula 1v=(7)+(12)+(13)−(5) in the management table.

In the next time from 9:01 to 9:02, the behavior of the power source voltage does not change, but among the electrical devices 14, only Device (8) is changing, and thus the image forming apparatus 12C records the formula 0v=−(8) in the management table. At this point, since Device (8) changes from running to not running even though there is no change in the power source voltage, Device (8) is determined not to be connected to the same power system 16C as the image forming apparatus 12C. Consequently, Device (8) is excluded from the group connected to the same power system 16C as the image forming apparatus 12C.

In the next time from 9:02 to 9:03, the power source voltage changes by 7v, while among the electrical devices 14, the running conditions of Devices (3), (5), (9), and (11) are changing, and thus the image forming apparatus 12C records the formula 7v=(5)+(9)+(11)−(3) in the management table.

In the next time from 9:03 to 9:04, the power source voltage changes by 3v, while among the electrical devices 14, the running conditions of Devices (4), (12), and (14) are changing, and thus the image forming apparatus 12C records the formula −3v=(14)−(4)−(12) in the management table.

In the next time from 9:04 to 9:05, there is no change in the behavior of the power source voltage, while among the electrical devices 14, the running conditions of Devices (8) and (9) are changing, and thus the image forming apparatus 12C records the formula 0v=(8)−(9) in the management table. At this point, since Devices (8) and (9) are changing even though there is no change in the behavior of the power source voltage, Devices (8) and (9) are excluded from the group connected to the same power system 16C as the image forming apparatus 12C.

In the next time from 9:05 to 9:06, the power source voltage changes by 8v, while among the electrical devices 14, the running conditions of Devices (3), (7), (11), and (13) are changing, and thus the image forming apparatus 12C records the formula −8v=(3)−(7)−(11)−(13) in the management table.

In the next time from 9:06 to 9:07, the power source voltage changes by 2v, while among the electrical devices 14, the running conditions of Devices (5) and (6) are changing, and thus the image forming apparatus 12C records the formula $-2v=(6)-(5)$ in the management table.

In the next time from 9:07 to 9:08, the power source voltage changes by 2v, while among the electrical devices 14, the running conditions of Devices (4) and (8) are changing, and thus the image forming apparatus 12C records the formula $2v=(4)-(8)$ in the management table. At this point, since Device (8) is already excluded from the group connected to the same power system 16C as the image forming apparatus 12C, the formula becomes $2v=(4)$. At this point, since the voltage change matches the change in the running conditions, Device (4) is identified as being connected to the same power system 16C as the image forming apparatus 12C.

In the next time from 9:08 to 9:09, the power source voltage changes by 3v, while among the electrical devices 14, the running conditions of Devices (1), (2), (6), (7), and (13) are changing, and thus the image forming apparatus 12C records the formula $3v=(1)+(2)+(7)+(13)-(6)$ in the management table.

In the next time from 9:09 to 9:10, the power source voltage changes by 7v, while among the electrical devices 14, the running conditions of Devices (5) and (11) are changing, and thus the image forming apparatus 12C records the formula $7v=(5)+(11)$ in the management table. Note that Devices (5) and (11) are excluded from the group connected to the same power system 16C as the image forming apparatus 12C from the results of the image forming apparatuses 12A and 12B.

In the next time from 9:10 to 9:11, the power source voltage changes by 3v, while among the electrical devices 14, the running conditions of Devices (1), (8), (13), and (14) are changing, and thus the image forming apparatus 12C records the formula $-3v=(8)-(1)-(13)-(14)$ in the management table.

Since each image forming apparatus 12 identifies the electrical devices 14 connected to the same power system 16 as each image forming apparatus 12 itself in this way, the groups connected to the same power systems 16 are detected, even when electrical devices 14 are added or removed.

The information processing system 10 according to the exemplary embodiment uses the group identification results for the power systems 16 to which each of the electrical devices 14 is connected, and conducts control such as peak shifting and issuing power-saving mode instructions for a power target. Furthermore, each image forming apparatus 12 additionally creates a report, such as which electrical devices 14 on which power systems 16 are using a large amount of power.

Note that for the identification of which power system 16 an electrical device 14 is connected to, an initial setup mode that causes each breaker 20 to operate individually during installation may also be prepared.

In addition, an information-sharing process may be conducted so that even if the parent image forming apparatus 12 malfunctions, another image forming apparatus 12 operates as a backup.

Also, the information processing system 10 according to the exemplary embodiment may manage not only a single business facility, but may also manage multiple business facilities via a communication medium such as a network.

Also, in the case of managing multiple business facilities, remote control may be conducted via the communication medium.

Next, a specific process conducted by the information processing system 10 according to the exemplary embodiment configured as above will be described.

Figure 7:
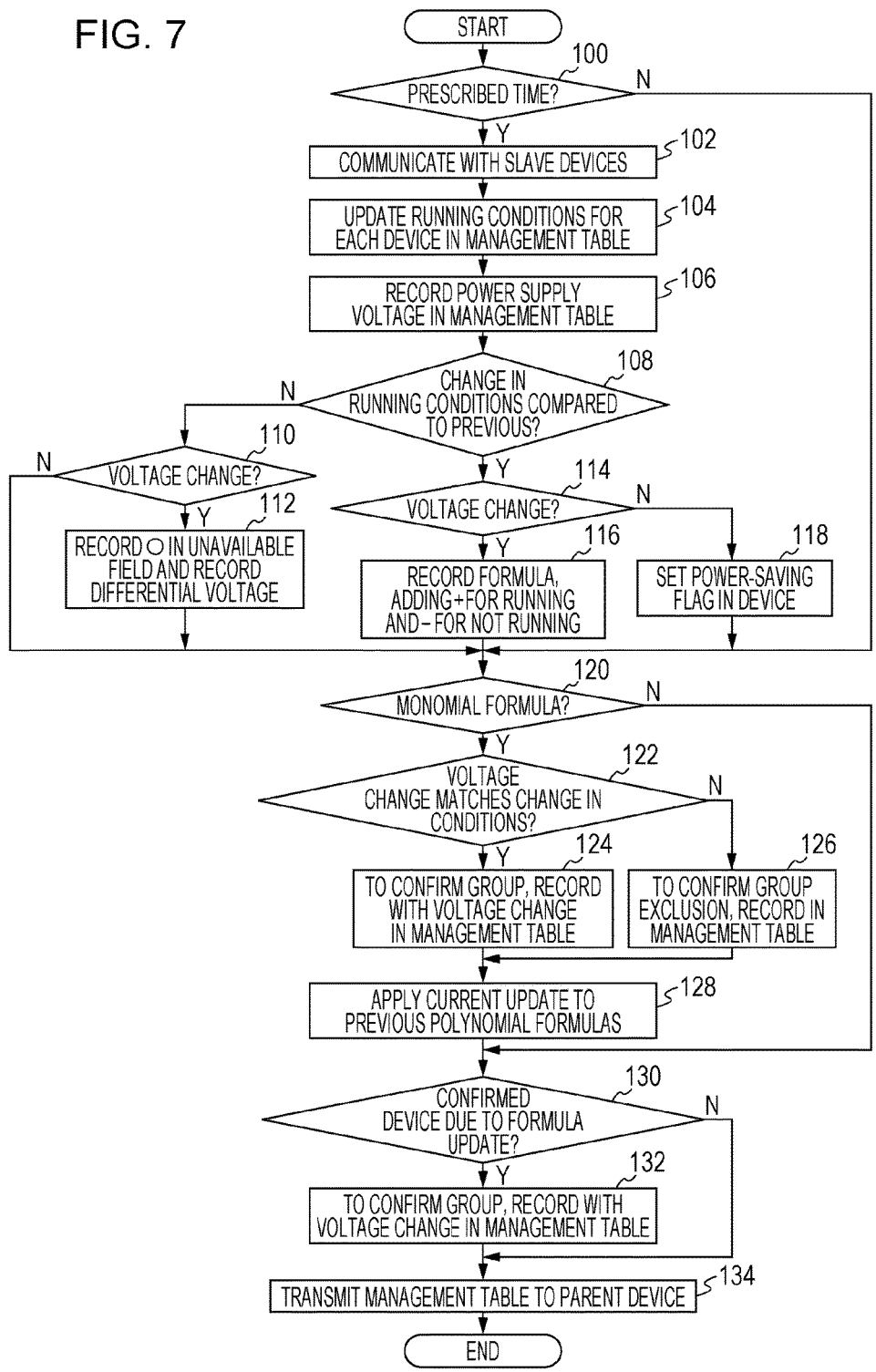
FIG. 7 is a flowchart illustrating an example of a flow of a process by which respective child image forming apparatuses according to an exemplary embodiment record and transmit a management table to a parent image forming apparatus.

First, a process by which each child image forming apparatus 12 records and transmits a management table to the parent image forming apparatus 12 will be described. FIG. 7 is a flowchart illustrating an example of a flow of a process by which each child image forming apparatus 12 according to the exemplary embodiment records and transmits a management table to the parent image forming apparatus 12.

First, in step 100, the CPU 12A determines whether or not a predetermined set time has been reached. If the determination is positive, the process proceeds to step 102, whereas if negative, the process proceeds to step 120.

In step 102, the CPU 12A communicates with the slave electrical devices 14 and acquires the running conditions of each electrical device 14. The process then proceeds to step 104.

In step 104, the CPU 12A updates the running conditions for each device in the management table, and the process proceeds to step 106.

In step 106, the CPU 12A records the supplied power source voltage in the management table, and the process proceeds to step 108.

In step 108, the CPU 12A compares against the previous time, and determines whether or not a change in the running conditions has occurred. If the determination is negative, the process proceeds to step 110, whereas if positive, the process proceeds to step 114.

In step 110, the CPU 12A determines whether or not there is a change in the power source voltage. If the determination is positive, the process proceeds to step 112, whereas if negative, the process proceeds to step 120.

In step 112, since there is a change in the power source voltage even though there is no change in the running conditions of the electrical devices 14, the CPU 12A records "O" in an Unavailable field to indicate that there is a running device with which communication is unavailable, and also records the differential voltage. The process then proceeds to step 120.

Meanwhile, in step 114, the CPU 12A determines whether or not there is a change in the power source voltage. If the determination is positive, the process proceeds to step 116, whereas if negative, the process proceeds to step 118.

In step 116, the CPU 12A adds the running conditions ("O" if running, "–" if not running) and records a formula in the management table. The process then proceeds to step 120.

In step 118, the CPU 12A sets a power-saving flag for the relevant device, and the process proceeds to step 120. Note that the power-saving flag indicates a candidate for exclusion from the group of the power system 16 to which the relevant image forming apparatus 12 is connected.

In step 120, the CPU 12A determines whether or not the formula is a monomial formula. If the determination is positive, the process proceeds to step 122, whereas if negative, the process proceeds to step 130.

In step 122, the CPU 12A determines whether or not the change in the power source voltage and the change in the running conditions match. In other words, the CPU 12A determines whether or not the change in the power source voltage and the change in the running conditions of the electrical devices 14 are linked. If the determination is positive, the process proceeds to step 124, whereas if negative, the process proceeds to step 126.

In step 124, the CPU 12A records the management table together with the voltage change of the power source voltage to confirm the group of the power system 16. The process then proceeds to step 128.

In step 126, the CPU 12A records the management table to confirm exclusion from the group of the power system 16 to which the relevant image forming apparatus 12 is connected. The process then proceeds to step 128.

In step 128, the CPU 12A applies the current update to the previous polynomial formulas, and the process proceeds to step 130.

In step 130, the CPU 12A determines whether or not there is a device confirmed to be in the group of a power system 16 as a result of updating the formulas. If the determination is positive, the process proceeds to step 132, whereas if negative, the process proceeds to step 134.

In step 132, the CPU 12A records the management table together with the voltage change of the power source voltage in the management table to confirm the group of the power system 16. The process then proceeds to step 134.

In step 134, the CPU 12A transmits the management table to the parent image forming apparatus 12, and ends the processing sequence.

Figure 8:
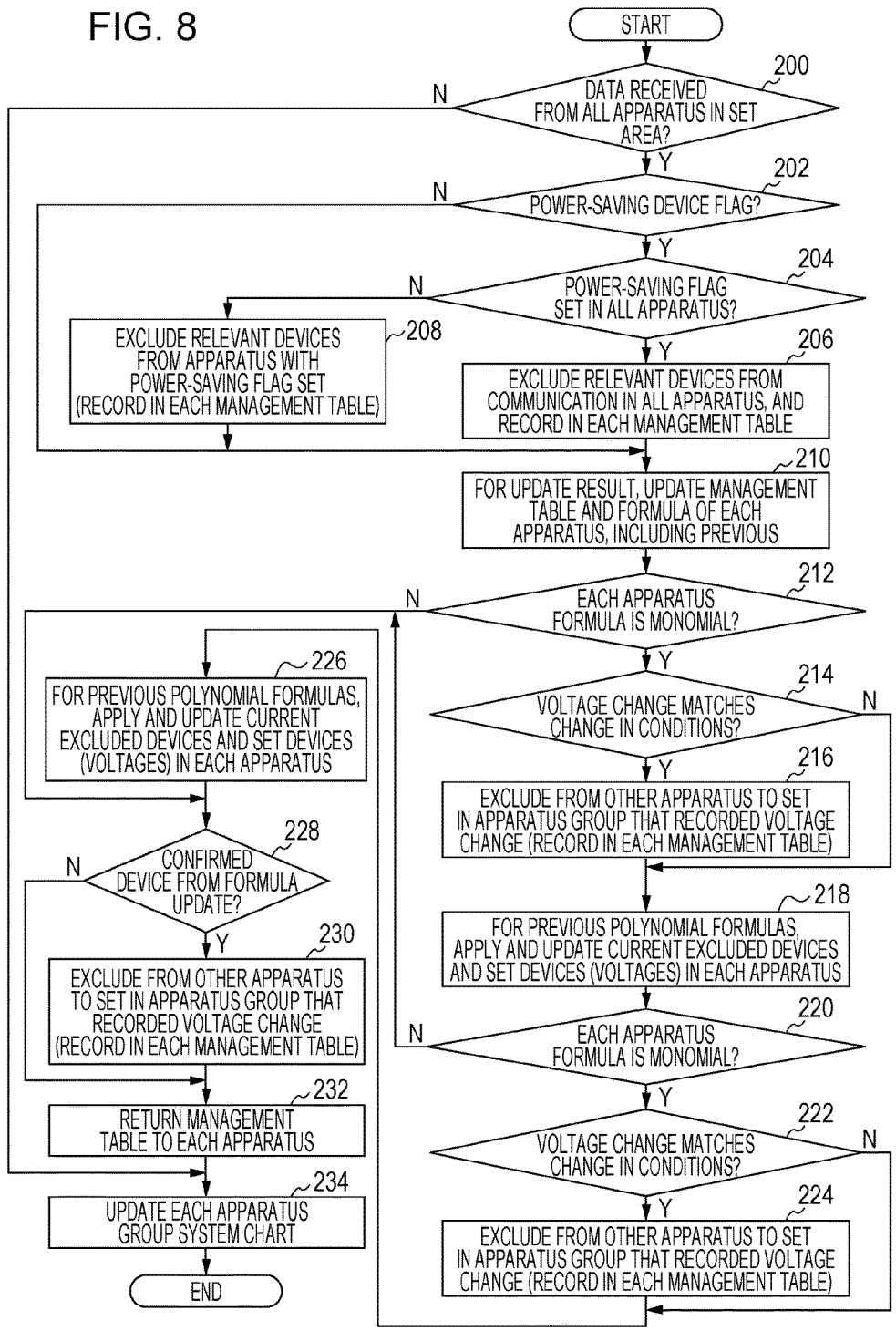
FIG. 8 is a flowchart illustrating an example of a flow of a process in a case in which a parent image forming apparatus according to an exemplary embodiment receives a management table from a child image forming apparatus.

Next, a process in a case in which the parent image forming apparatus 12 receives a management table from a child image forming apparatus 12 will be described. FIG. 8 is a flowchart illustrating an example of a flow of a process in a case in which the parent image forming apparatus 12 according to an exemplary embodiment receives a management table from a child image forming apparatus 12.

In step 200, the CPU 12A determines whether or not data (a management table) has been received from all image forming apparatuses 12 in a preset area. If the determination is positive, the process proceeds to step 202, whereas if negative, the process proceeds to step 234.

In step 202, the CPU 12A determines whether or not the power-saving flag is set. This determination determines whether or not there exists an electrical device 14 for which the power-saving flag has been set in step 118 discussed above. If the determination is positive, the process proceeds to step 204, whereas if negative, the process proceeds to step 210.

In step 204, the CPU 12A determines whether or not the power-saving flag has been set in all image forming apparatuses 12. If the determination is positive, the process proceeds to step 206, whereas if negative, the process proceeds to step 208.

In step 206, the CPU 12A records each management table while excluding the relevant devices from communication among all of the image forming apparatuses 12. The process then proceeds to step 210.

In step 208, the CPU 12A records each management table so as to exclude the relevant devices from the image forming apparatuses 12 in which the power-saving flag is set. The process then proceeds to step 210.

In step 210, the CPU 12A updates the management table and formulas of each image forming apparatus 12, including those of the past, with the above update results, and the process proceeds to step 212.

In step 212, the CPU 12A determines whether or not a polynomial formula exists for each image forming apparatus 12. If the determination is positive, the process proceeds to step 214, whereas if negative, the process proceeds to step 228.

In step 214, the CPU 12A determines whether or not, for an electrical device 14 of a monomial formula, the change in the power source voltage matches the change in the running conditions (change of operation) of the electrical device. If the determination is positive, the process proceeds to step 216, whereas if negative, the process proceeds to step 218.

In step 216, the CPU 12A decides that the electrical device 14 in a monomial formula belongs to the group of the power system 16 to which is connected the image forming apparatus 12 that recorded a change in the power source voltage. Additionally, the CPU 12A records each management table so as to exclude that electrical device 14 from the groups of the power systems 16 to which the other image forming apparatuses 12 are connected respectively. The process then proceeds to step 218.

In step 218, the CPU 12A updates the previous polynomial formulas to apply the current excluded devices and set devices (voltages) in each image forming apparatus 12. The process then proceeds to step 220.

In step 220, the CPU 12A determines whether or not a monomial formula exists among the formulas recorded for each image forming apparatus 12. If the determination is positive, the process proceeds to step 222, whereas if negative, the process proceeds to step 228.

In step 222, the CPU 12A determines whether or not, for an electrical device 14 of a monomial formula, the change in the power source voltage matches the change in the running conditions (change of operation) of the electrical device. If the determination is positive, the process proceeds to step 224, whereas if negative, the process proceeds to step 226.

In step 224, the CPU 12A decides that the electrical device 14 in a monomial formula belongs to the group of the power system 16 to which is connected the image forming apparatus 12 that recorded a change in the power source voltage. Additionally, the CPU 12A records each management table so as to exclude that electrical device 14 from the groups of the power systems 16 to which the other image forming apparatuses 12 are connected respectively. The process then proceeds to step 226.

In step 226, the CPU 12A updates the previous polynomial formulas to apply the current excluded devices and set devices (voltages) in each image forming apparatus 12. The process then proceeds to step 228.

In step 228, the CPU 12A determines whether or not there is a device confirmed to be in the group of a power system 16 as a result of updating the formulas. If the determination is positive, the process proceeds to step 230, whereas if negative, the process proceeds to step 232.

In step 230, the CPU 12A decides that the device confirmed to be in the group of a power system 16 belongs to the group of the power system 16 to which is connected the image forming apparatus 12 that recorded the change in the power source voltage. Additionally, the CPU 12A records each management table so as to exclude that electrical device 14 from the groups of the power systems 16 to which the other image forming apparatuses 12 are connected respectively. The process then proceeds to step 232.

In step 232, the CPU 12A returns the updated management tables to each of the image forming apparatuses 12, and the process proceeds to step 234.

In step 234, the CPU 12A updates each apparatus group system chart expressing the group of the power system 16 to which each image forming apparatus 12 and the electrical devices 14 are connected, and the processing sequence ends.

Figure 9:
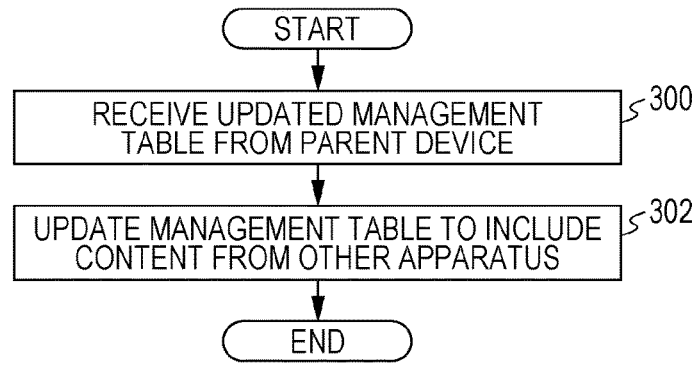
FIG. 9 is a flowchart illustrating an example of a flow of a process conducted by a child image forming apparatus when a management table is returned from a parent image forming apparatus according to an exemplary embodiment.

Next, a process by a child image forming apparatus 12 conducted when a management table is returned from the parent image forming apparatus 12 will be described. FIG. 9 is a flowchart illustrating an example of a flow of a process conducted by a child image forming apparatus 12 when a management table is returned from the parent image forming apparatus 12 according to the exemplary embodiment.

In step 300, the CPU 12A receives an updated version of a management table from the parent image forming apparatus 12, and the process proceeds to step 302.

In step 302, the CPU 12A updates the management table to include the updated content of the other child image forming apparatuses 12, and the processing sequence ends.

In other words, from the management table returned from the parent image forming apparatus 12, the groups of power systems 16 to which are connected electrical devices 14 not identified by the child image forming apparatus 12 itself are identified.

Figure 10:
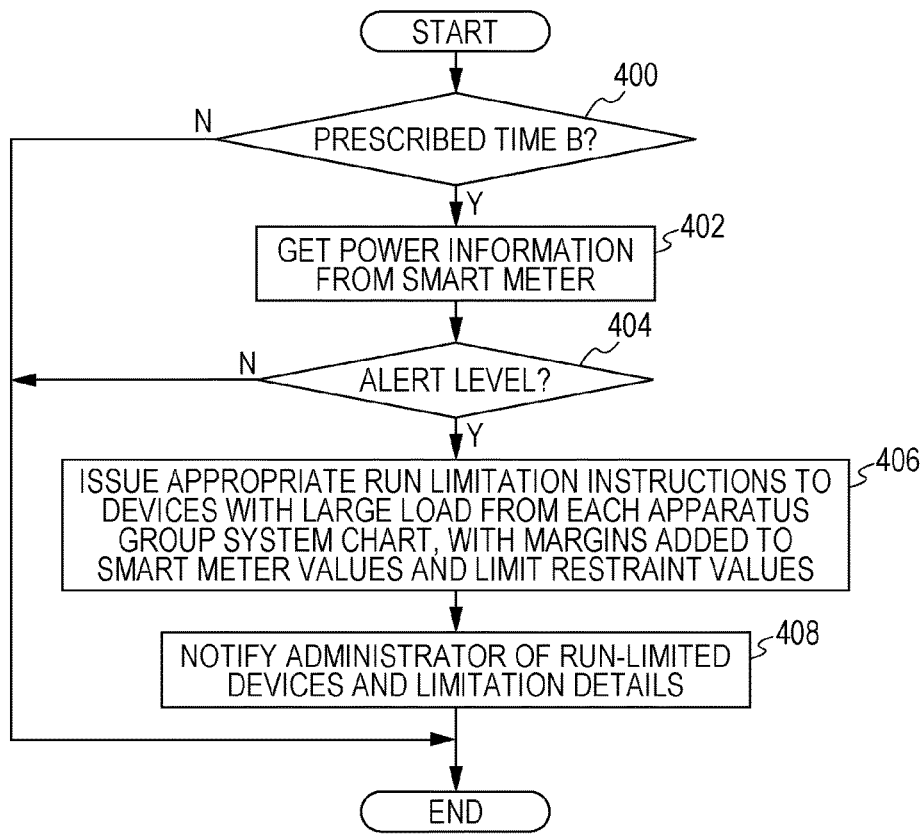
FIG. 10 is a flowchart illustrating a flow of an example of control for avoiding a device inexpedience due to a voltage drop, conducted by a parent image forming apparatus according to an exemplary embodiment.

Next, a control for avoiding a device inexpedience due to a voltage drop, conducted by the parent image forming apparatus 12, will be described. FIG. 10 is a flowchart illustrating a flow of an example of control for avoiding a device inexpedience due to a voltage drop, conducted by the parent image forming device 12 according to the exemplary embodiment.

In step 400, the CPU 12A determines whether or not a predetermined set time B has been reached. If the determination is positive, the process proceeds to step 402, whereas if negative, the process ends immediately. Note that the set time B may the same time as the set time in step 100 of the process by the child image forming apparatus 12, or a different time.

In step 402, the CPU 12A acquires power information from the smart meter 22, and the process proceeds to step 404.

In step 404, the CPU 12A determines whether or not the power value expressed by the power information acquired from the smart meter 22 is at a predetermined alert level. This determination determines whether or not the current conditions of power consumption are equal to or greater than a predetermined power, for example. If the determination is positive, the process proceeds to step 406, whereas if negative, the process ends immediately.

In step 406, the CPU 12A issues appropriate run limitation instructions to devices with a larger load than other devices according to each apparatus group system chart updated in step 234 above, in which margins are added to the smart meter values and limit restraint values. The process then proceeds to step 408. For example, the CPU 12A issues to each apparatus and device (the image forming apparatuses 12 and the electrical devices 14) a run limitation instruction (an on/off instruction, or an instruction to run at low power, such as an instruction to switch to a power-saving mode), so that the smart meter value reaches the value obtained by subtracting the margin value from the limit restrain value. Each image forming apparatus 12 and electrical device 14 conducts power-saving control according to the notification from the parent image forming apparatus 12, thereby avoiding a device inexpedience due to a voltage drop.

In step 408, the CPU 12A notifies a predetermined personal computer (PC) of an administrator or the like of the run-limited devices and the limitation details.

Consequently, suitable power-saving instructions from among the power-saving modes held by all of the image forming apparatuses 12 are issued, or if avoiding power consumption is difficult in a certain image forming apparatus 12, other electrical devices 14 are instructed to enter a power-saving mode while accounting for convenience from the management table. As a result, a device inexpedience due to a voltage drop is avoided.

Figure 11:
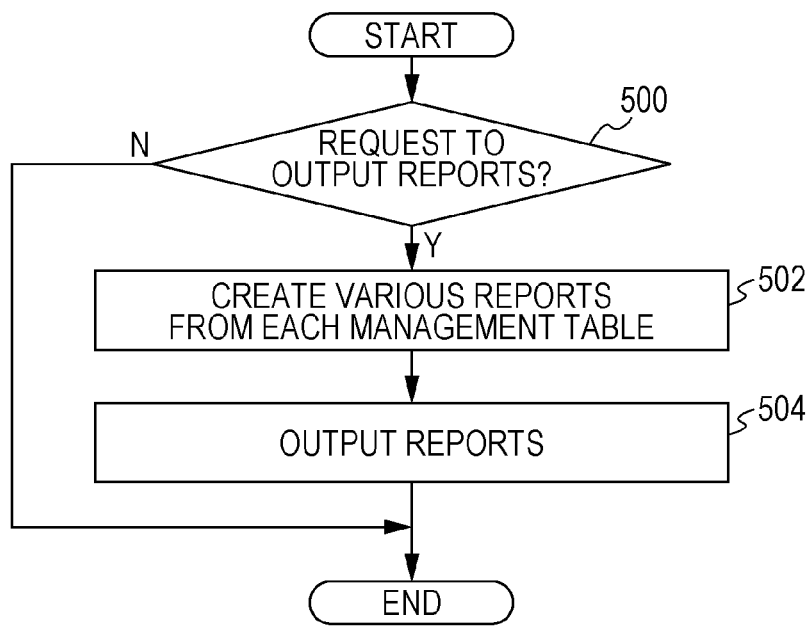
FIG. 11 is a flowchart illustrating a flow of a process conducted by a parent image forming apparatus according to an exemplary embodiment in a case in which the parent image forming apparatus is requested to output reports related to power consumption.

FIG. 11 is a flowchart illustrating a flow of a process conducted by the parent image forming device 12 according to the exemplary embodiment in a case in which the parent image forming device 12 is requested to output reports related to power consumption.

In step 500, the CPU 12A determines whether or not a report output request has been made. This determination determines whether or not a report request has been made as a result of the operating unit 12E of the parent image forming apparatus 12 being operated, or whether or not a report request has been received from a personal computer (PC) connected to the communication link 26, for example. If the determination is positive, the process proceeds to step 502, whereas if negative, the process ends immediately.

In step 502, the CPU 12A creates various reports from each of the management tables, and the process proceeds to step 504. For example, a report indicating which electrical devices 14 on which power systems 16 are using a large amount of power is created.

In step 504, the CPU 12A outputs the reports, and the processing sequence ends. The method of outputting the reports may be, for example, displaying the reports on the display 12F. Alternatively, the reports may be output by being formed as images on one or more paper sheets. Alternatively, the reports may be transmitted to the origin of the report output request via electronic mail or the like.

Note that although the foregoing exemplary embodiment describes an example of applying the image forming apparatus 12 as an information processing apparatus, the configuration is not limited thereto, and an information processing apparatus such as a personal computer (PC) may also be applied.

Also, the processes conducted by each image forming apparatus 12 according to the foregoing exemplary embodiment may be taken to be processes performed by software, process performed by hardware, or processes performed by a combination of the two. Also, a process conducted by the image forming apparatus 12 may be distributed by being stored on a storage medium as a program.

In addition, the present invention is not limited to the foregoing, and obviously various modifications other than the above may be carried out within a scope that does not depart from the gist of the present invention. The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
a detector that detects a voltage of a power system to which the information processing apparatus itself is connected, from among a plurality of power systems to which are respectively connected a plurality of electrical devices respectively available for communication;

a receiver that receives running information expressing running conditions of each of the plurality of electrical devices; and a processor configured to execute a reporting unit that uses a detection result of the detector and a reception result of the receiver to report whether or not an electrical device corresponding to the running information received by the receiver is connected to the power system to which the information processing apparatus itself is connected.

2. The information processing apparatus according to claim 1, wherein the detection result of the detector and the reception result of the receiver are updated every time a predetermined amount of time elapses.

3. The information processing apparatus according to claim 1, wherein the reporting unit uses a formula expressing a relationship between the detection result and the running information to identify whether or not the electrical device corresponding to the running information received by the receiver is connected to the power system to which the information processing apparatus itself is connected.

4. An information processing system, comprising:

the information processing apparatus according to claim 1; and a plurality of electrical devices connected to at least one of the plurality of power systems, and able to transmit the running information to the information processing apparatus.

5. The information processing system according to claim 4, further comprising:

a plurality of the information processing apparatuses, each connected to any one of the plurality of power systems; and a smart meter that detects a total electric power of each power system to which the plurality of the information processing apparatuses is connected, wherein provided that any one of the plurality of the information processing apparatuses is set as a parent apparatus, while the other of the plurality of the information processing apparatuses are set as child apparatuses, the parent information processing apparatus manages a report result of the reporting unit of the child information processing apparatuses, and in addition, if a detected result of the smart meter reaches an electric power of a predetermined alert level, the parent information processing apparatus uses the report result of the reporting unit of the plurality of the information processing apparatuses to instruct power-saving driving in a device having a larger load than others.

6. A non-transitory computer-readable medium storing a program causing a computer to execute a process for processing information, the process comprising:

causing the computer to function as each element of the information processing apparatus according to claim 1.

7. The information processing apparatus according to claim 1, wherein the processor is further configured to determine whether or not the electrical device corresponding to the running information received by the receiver is connected to the power system to which the information processing apparatus itself is connected by determining that a change in the voltage of the power system to which the information processing apparatus is connected is linked to a change in the running information of an electric device, among the plurality of electrical devices.

8. The information processing apparatus according to claim 1, wherein the detection result is the detected voltage of the power system to which the information processing apparatus itself is connected, and the reception result is the running information expressing running conditions of each of the plurality of electrical devices.

9. The information processing apparatus according to claim 8, wherein the processor is further configured to decide that the electrical device is in a group of the power system to which is connected the image forming apparatus that recorded the change in the voltage of the power system.

10. An information processing apparatus connected to a power system, among a plurality of power systems, comprising:

a processor configured to:

receive a first voltage of a power system to which the information processing apparatus is connected at a first time;

receive a second voltage of the power system at a second time different from the first time;

receive a first status information indicating operating status of each of a plurality of electrical devices connected to the plurality of power systems at the first time;

receive a second status information indicating the operating status of each of the plurality of electrical devices connected to the plurality of power systems at the second time;

determine whether a change in the operating status for each of the plurality of electrical devices has occurred by comparing the first status information with the second status information;

determine whether a change in voltage of the power system has occurred by comparing the first voltage and the second voltage;

determine whether the change in the voltage and the change in the operating status of an electrical device, among the plurality of electrical devices, is linked; and determine that the electrical device is connected to the power system to which the information processing apparatus is connected, in response to a determination that the change in the voltage and the change in the operating status of the electrical device is linked.

* * * * *